(12) United States Patent
Sarh et al.

(10) Patent No.: US 9,764,464 B2
(45) Date of Patent: Sep. 19, 2017

(54) ROBOT INCLUDING TELESCOPIC ASSEMBLIES FOR POSITIONING AN END EFFECTOR

(75) Inventors: Branko Sarh, Huntington Beach, CA (US); Angelica Davancens, Reseda, CA (US)

(73) Assignee: The Boeing Company, Chicago, IL (US)

( * ) Notice: Subject to any disclaimer, the term of this patent is extended or adjusted under 35 U.S.C. 154(b) by 486 days.

(21) Appl. No.: 13/197,757

(22) Filed: Aug. 3, 2011

(65) Prior Publication Data

US 2013/0031764 A1    Feb. 7, 2013

(51) Int. Cl.
| B25J 17/00 | (2006.01) |
| B25J 17/02 | (2006.01) |
| B25J 18/00 | (2006.01) |
| B25J 9/10 | (2006.01) |

(52) U.S. Cl.
CPC ......... *B25J 9/106* (2013.01); *Y10T 29/49826* (2015.01); *Y10T 29/5191* (2015.01); *Y10T 74/20329* (2015.01)

(58) Field of Classification Search
CPC ......... Y10T 74/20305; Y10T 74/20317; Y10T 74/20329; Y10T 74/18672; B25J 9/106; B25J 9/126; B25J 9/003; B25J 9/0033; B25J 9/0036; B25J 9/0045; B25J 9/023; B25J 18/02; B25J 18/025; B25J 17/0258
USPC ............... 74/490.01, 490.02, 490.05, 89.35
See application file for complete search history.

(56) References Cited

U.S. PATENT DOCUMENTS

| 3,404,580 | A | * | 10/1968 | Valenti | .............. 74/89.35 |
| 4,687,400 | A | * | 8/1987 | Lichti | .............. B25J 9/0084 |
| | | | | | 294/117 |
| 4,712,969 | A | * | 12/1987 | Kimura | .............. B25J 9/06 |
| | | | | | 148/402 |
| 4,962,676 | A | * | 10/1990 | Vainstock | .............. 74/490.1 |
| 4,967,947 | A | | 11/1990 | Sarh | |
| 5,740,699 | A | * | 4/1998 | Ballantyne et al. | ...... 74/490.06 |
| 5,884,532 | A | * | 3/1999 | Rixon et al. | .............. 74/512 |
| 6,085,670 | A | * | 7/2000 | Genov | .............. B23Q 1/032 |
| | | | | | 108/144.11 |

(Continued)

FOREIGN PATENT DOCUMENTS

| CN | 2411157 Y | 12/2000 |
| CN | 20109086 A | 7/2008 |

(Continued)

OTHER PUBLICATIONS

Sarh et al., U.S. Appl. No. 12/117,153, filed May 8, 2008 entitled "Synchronous Robotic Operation on a Structure Having a Confined Space".

(Continued)

*Primary Examiner* — William Kelleher
*Assistant Examiner* — Jake Cook
(74) *Attorney, Agent, or Firm* — Miller, Matthias & Hull LLP

(57) ABSTRACT

A robot includes an actuator assembly, first and second parallel telescoping lead screw assemblies cantilevered from the actuator assembly, and an end effector supported by ends of the lead screw assemblies. The actuator assembly causes each lead screw assembly to independently deploy and retract.

9 Claims, 8 Drawing Sheets

(56) References Cited

U.S. PATENT DOCUMENTS

| | | | |
|---|---|---|---|
| 6,328,510 B1* | 12/2001 | Hanrath | B23Q 1/4861 33/1 M |
| 6,330,837 B1* | 12/2001 | Charles | B25J 11/00 74/490.06 |
| 6,723,106 B1* | 4/2004 | Charles et al. | 606/130 |
| 7,967,549 B2 | 6/2011 | Geist et al. | |
| 8,301,302 B2 | 10/2012 | Sarh | |
| 2008/0155807 A1 | 7/2008 | Toh et al. | |
| 2009/0283949 A1 | 11/2009 | Brown et al. | |
| 2010/0018334 A1* | 1/2010 | Lessing | 74/89.35 |
| 2010/0192715 A1* | 8/2010 | Vauchel et al. | 74/89.35 |
| 2010/0307278 A1* | 12/2010 | Mignano | 74/490.03 |

FOREIGN PATENT DOCUMENTS

| | | |
|---|---|---|
| CN | 101574805 A | 11/2009 |
| CN | 101855047 A | 10/2010 |
| EP | 2116340 A1 | 11/2009 |
| FR | 2 722 437 A1 | 1/1996 |
| FR | 2800659 A1 | 5/2001 |
| JP | S61 236493 A | 10/1986 |
| JP | S62 137327 A | 6/1987 |
| JP | 2000046140 A | 2/2000 |
| JP | 2003207013 A | 7/2003 |
| JP | 2003 231083 A | 8/2003 |
| JP | 2007290068 A | 8/2007 |
| JP | 2007290068 A | 11/2007 |
| JP | 2009078347 A | 4/2009 |
| JP | 2009269168 A | 11/2009 |
| JP | 2010023201 A | 2/2010 |
| WO | 2009069153 A1 | 6/2009 |

OTHER PUBLICATIONS

Wright, C. Johnson, A. Peck, A. McCord, Z. Naaktgeboren, A. Gianfortoni, P. Gonzalex-Rivero, M. Hatton, R. Choset, H. Design of a Modular Snake Robot. Proc of 2007 IEEE/RSJ Int Conf on Intelligent Robots and Systems. San Diego, CA. 2007.

Geist, J. Choset, H. Sarh, B. Brown, B. The Development of an Adaptive Jacobian Method for Dynamic Constraint Handling in Inverse Kinematics. Proc of CMU Mechanical Engineering Department Bennet Technical Conference. Apr. 21, 2006, Pittsburgh, USA.

Roy, B., and Asada, H., "Closed Loop Control of a Gravity-Assisted Underactuated Snake Robot with Application to Aircraft Wing-Box Assembly", Robotics: Science and Systems III, (W. Burgard, et al Ed.) Jun. 2007.

Roy, B.; Asada, H.H., Design of a Reconfigurable Robot Arm for Assembly Operations inside an Aircraft Wing-Box, Robotics and Automation, 2005. ICRA 2005. Proceedings of the 2005 IEEE International Conference on pp. 590-595, Apr. 18-22, 2005.

Roy, B., and Asada, H., "Non-linear Feedback Control of a Gravity-assisted Underactuated Manipulator with Application to Aircraft Assembly", accepted for publication in the IEEE Transactions on Robotics, Apr. 2009.

[Roy, B.; Asada, H.H., An Under-actuated Robot with a Hyper-articulated Deployable Arm Working Inside an Aircraft Wing-box, Intelligent Robots and Systems, 2005. (IROS 2005). 2005 IEEE/RSJ International Conference on pp. 4046-4050, Aug. 2-6, 2005.

Japanese Office Action for Related Patent Application No. 2012-172340; Report dated Apr. 26, 2016.

Chinese Office Action for Related Patent Application No. 201210271840.2; Report dated Feb. 24, 2017.

* cited by examiner

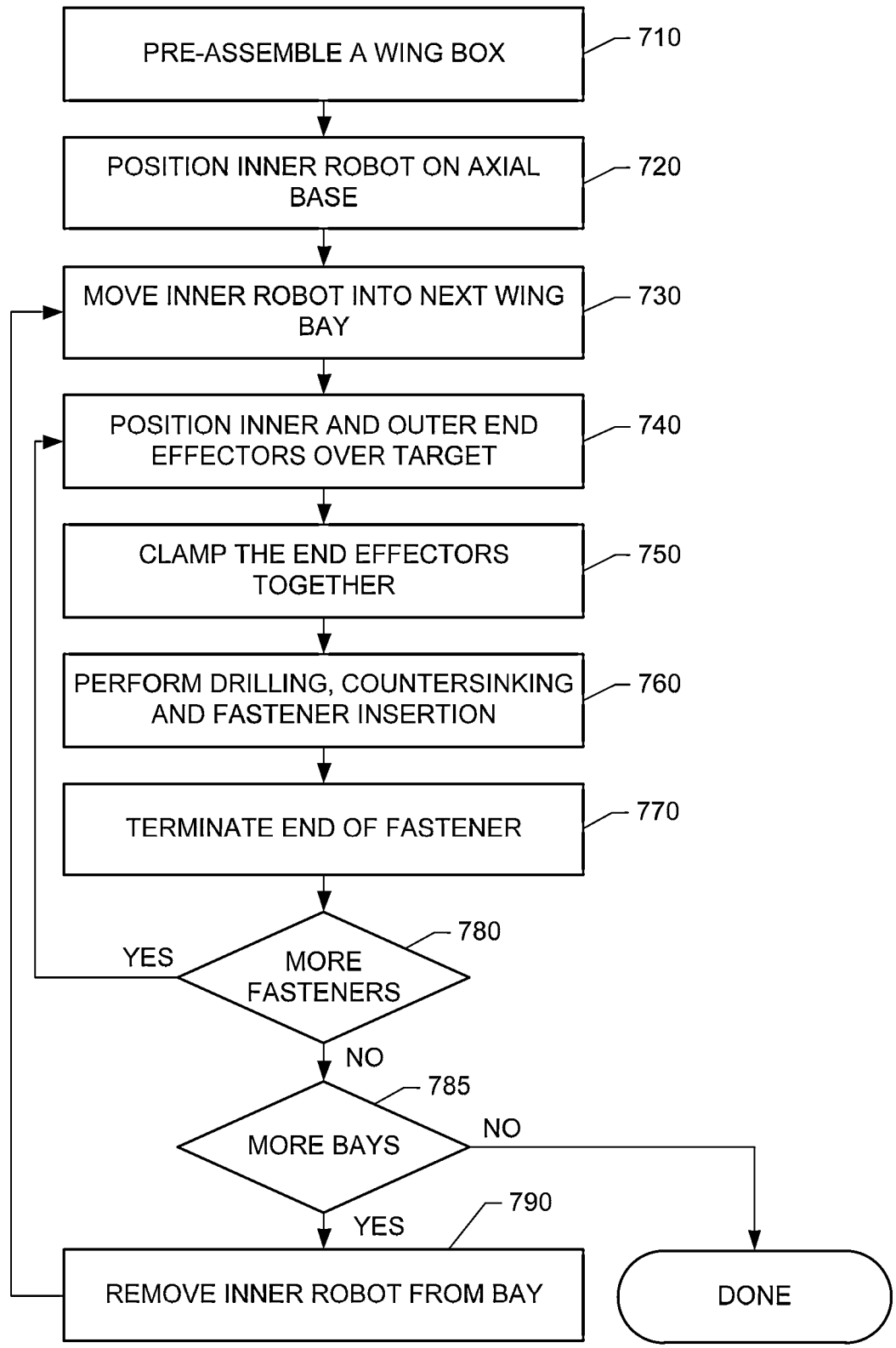

Reference is made to FIGS. 1 and 2. A robot 110 includes an actuator assembly 120, first and second parallel telescoping lead screw assemblies 130 and 140 cantilevered from the actuator assembly 120, and an end effector 150 supported by ends 132 and 142 of the lead screw assemblies 130 and 140.

ROBOT INCLUDING TELESCOPIC ASSEMBLIES FOR POSITIONING AN END EFFECTOR

BACKGROUND

During assembly of an aircraft, fastening operations are performed synchronously on opposite sides of various structures. A fastening operation may include drilling, countersinking and fastener insertion on one side of a structure, and terminating the end of each inserted fastener on the opposite side of the structure.

Consider fastening operations on a wing box of an aircraft. Drilling, countersinking and fastener insertion are performed by a robotic system outside the wing box. Sleeve and nut placement are performed inside the wing box by manual labor. A person enters a wing box through a small access port, and performs the sleeve and nut placement with hand tools while lying flat inside the wing box. On the order of several hundred thousand fasteners are installed and terminated on common aircraft wings.

It would be highly desirable to eliminate the manual labor and fully automate the fastening operations on both sides of the wing box. However, while placing a nut over the threads of a bolt might be a simple task for a human, it is not so simple for a robot. Precise positioning and orientation of a nut over a bolt is a complex task.

This task becomes even more complex due to space constraints inside the wing box. The wing box forms a narrow space that, at the tip, is only several inches high (see FIG. 4 for an example of a wing box). Moreover, the narrow space is accessible only through an access port. The robot would have to enter the narrow space via the access port, navigate past stringers inside the narrow space, locate ends of inserted fasteners, and position an end effector and place a sleeve and nut over each fastener end.

The task becomes even more complex because aircraft tolerances are extremely tight. The task becomes even more complex because the end effector typically weighs 40 to 50 pounds. The task becomes even more complex because the robot inside the narrow space has to synchronize its tasks with those of a robot outside the wing box.

SUMMARY

According to an embodiment herein, a robot comprises an actuator assembly, first and second parallel telescoping lead screw assemblies cantilevered from the actuator assembly, an end effector coupled to and supported by ends of the telescoping assemblies. The actuator assembly causes each telescoping assembly to independently deploy and retract.

According to another embodiment herein, a system can perform manufacturing operations on a structure having a confined space. The system comprises a first robot operable outside of the confined space for performing a set of manufacturing tasks on the structure, and a second robot operable within the confined space for performing a complementary set of manufacturing tasks on the structure. The second robot includes an actuator assembly, and first and second parallel telescoping lead screw assemblies cantilevered from the actuator assembly. An end of each telescoping assembly is pivoted to the end effector. The second robot further includes a controller for commanding the actuator to independently move each telescoping assembly end between a retracted position and a deployed position.

According to another embodiment herein, a method of manufacture within a confined space defined in part by a wall comprises moving an end effector into the confined space, using first and second parallel telescoping lead screw assemblies to translate and rotate the end effector until the end effector achieves a desired orientation with respect to a target within the confined space, and using a metal plate outside of the confined space to magnetically clamp the end effector against the wall.

BRIEF DESCRIPTION OF THE DRAWINGS

FIG. 7 is an illustration of a method of manufacturing a wing box.

DETAILED DESCRIPTION

Figure 1:
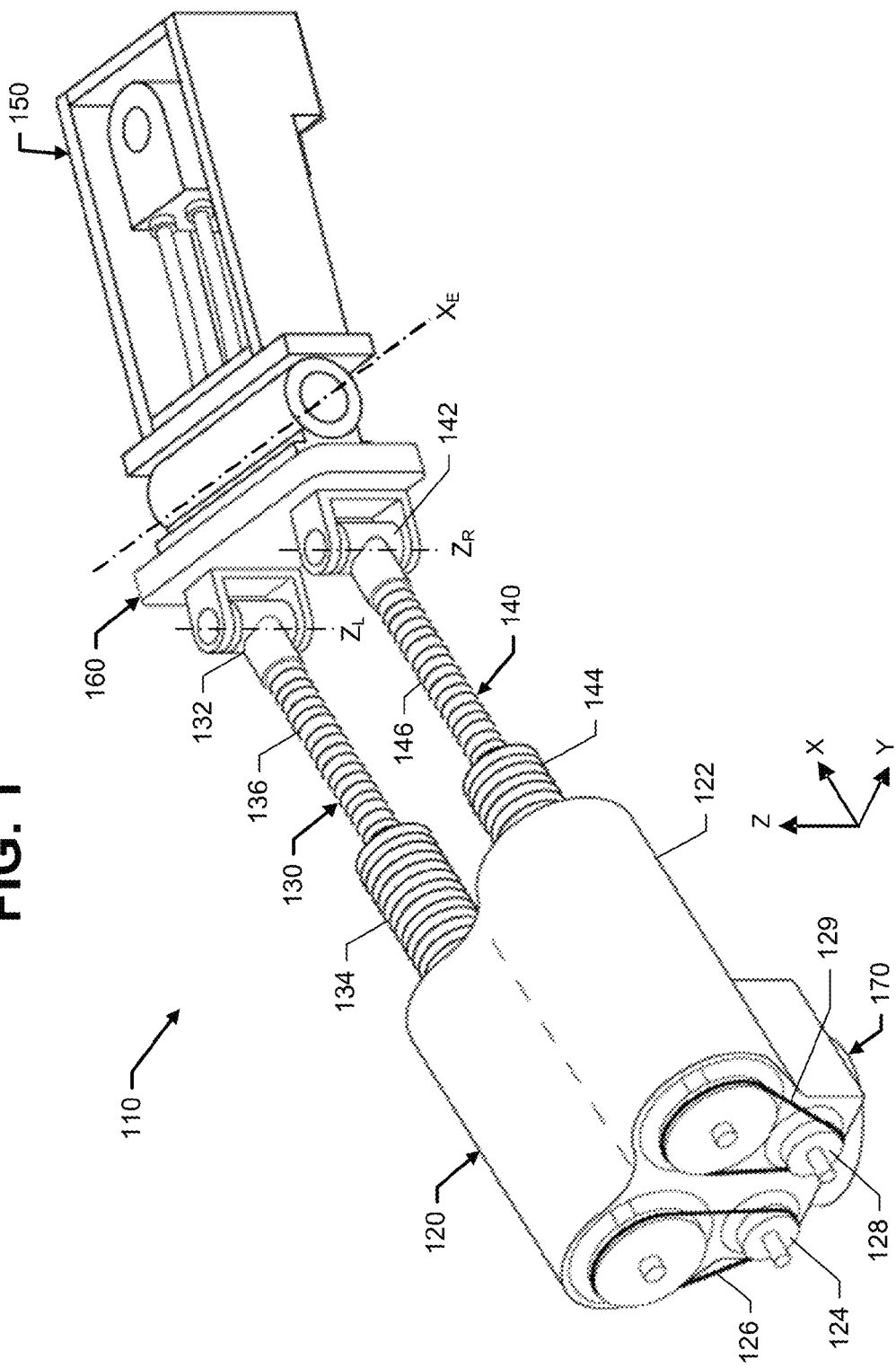
FIGS. 1 and 2 are illustrations of an embodiment of a robot including an end effector.
Figure 2:
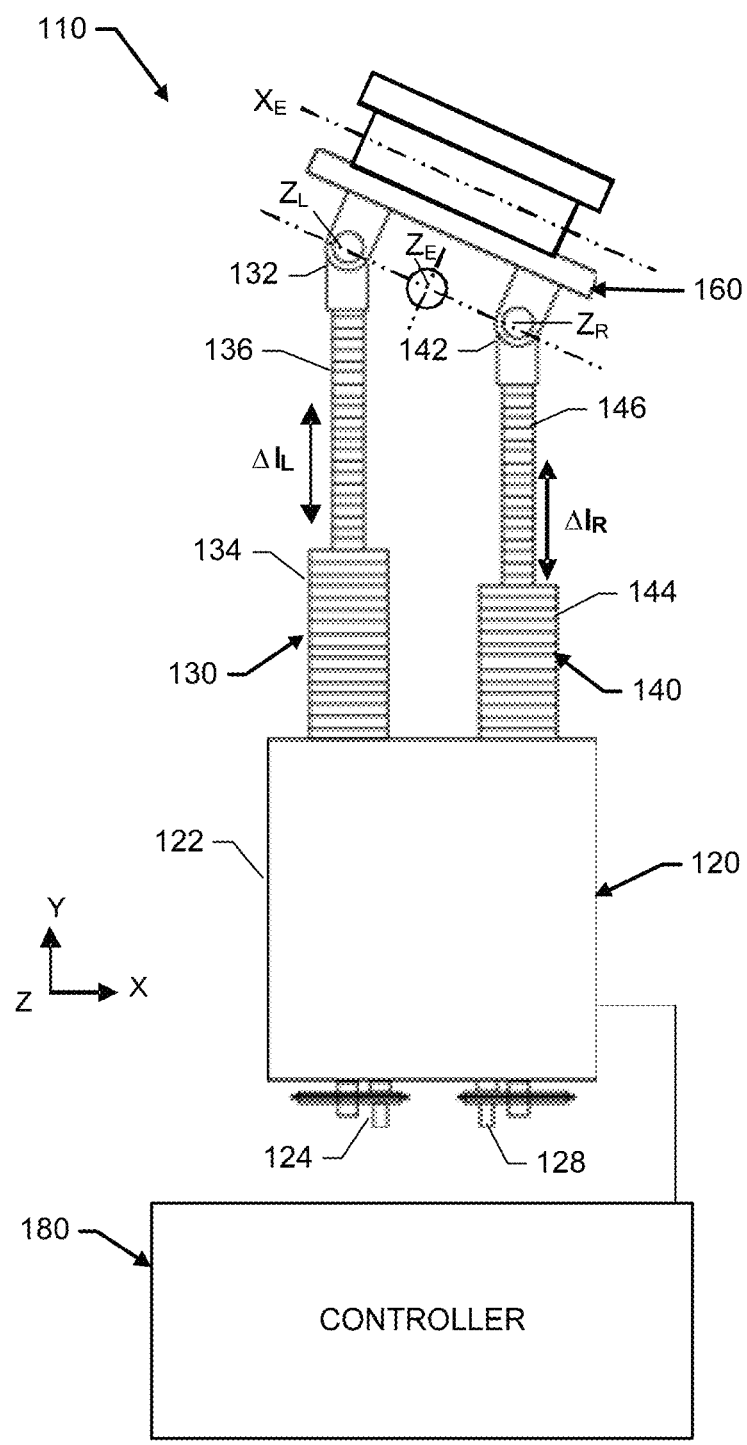

Reference is made to FIGS. 1 and 2. A robot 110 includes an actuator assembly 120, first and second parallel telescoping lead screw assemblies 130 and 140 cantilevered from the actuator assembly 120, and an end effector 150 supported by ends 132 and 142 of the lead screw assemblies 130 and 140.

The actuator assembly 120 causes each lead screw assembly 130 and 140 to independently deploy and retract. Consider an X-Y-Z coordinate system with respect to the actuator assembly 120. During retraction of a lead screw assembly 130 or 140, the end 132 or 142 moves along the X-axis towards the actuator assembly 120. During deployment of a lead screw assembly 130 or 140, the end 132 or 142 moves in the opposite direction along the X-axis, away from the actuator assembly 120.

The ends 132 and 142 are constrained from rotation. Thus, the ends 132 and 142 do not rotate about the X-axis.

Each telescoping assembly 130 and 140 includes a plurality of lead screws. In FIGS. 1 and 2, two leads screws 134 and 136 of the first telescoping assembly 130 are visible, and two lead screws 144 and 146 of the second telescoping assembly 140 are visible.

In some embodiments, each telescoping assembly 130 and 140 includes only the two visible lead screws. Consider the first telescoping assembly 130. The second lead screw 134 is retained within the actuator assembly's housing 122 such that it can be rotated. The second lead screw 134 has a bore with internal threads. The first lead screw 136 has external threads that engage the threaded bore of the second lead screw 134. Rotating the second lead screw 134 in one direction causes the first lead screw 136 to move into the bore and retract (since the end 132 of the outer lead screw 136 is constrained from rotation). Rotating the second lead screw 134 in the opposite direction causes the first lead screw 136 to move out of the bore and deploy. The second lead screw assembly 140 is constructed in a similar manner, with a second lead screw 144 retained for rotation within the housing 122, and a first lead screw 146 having external threads that engage an internally threaded bore of the second lead screw 144.

Figure 5A:
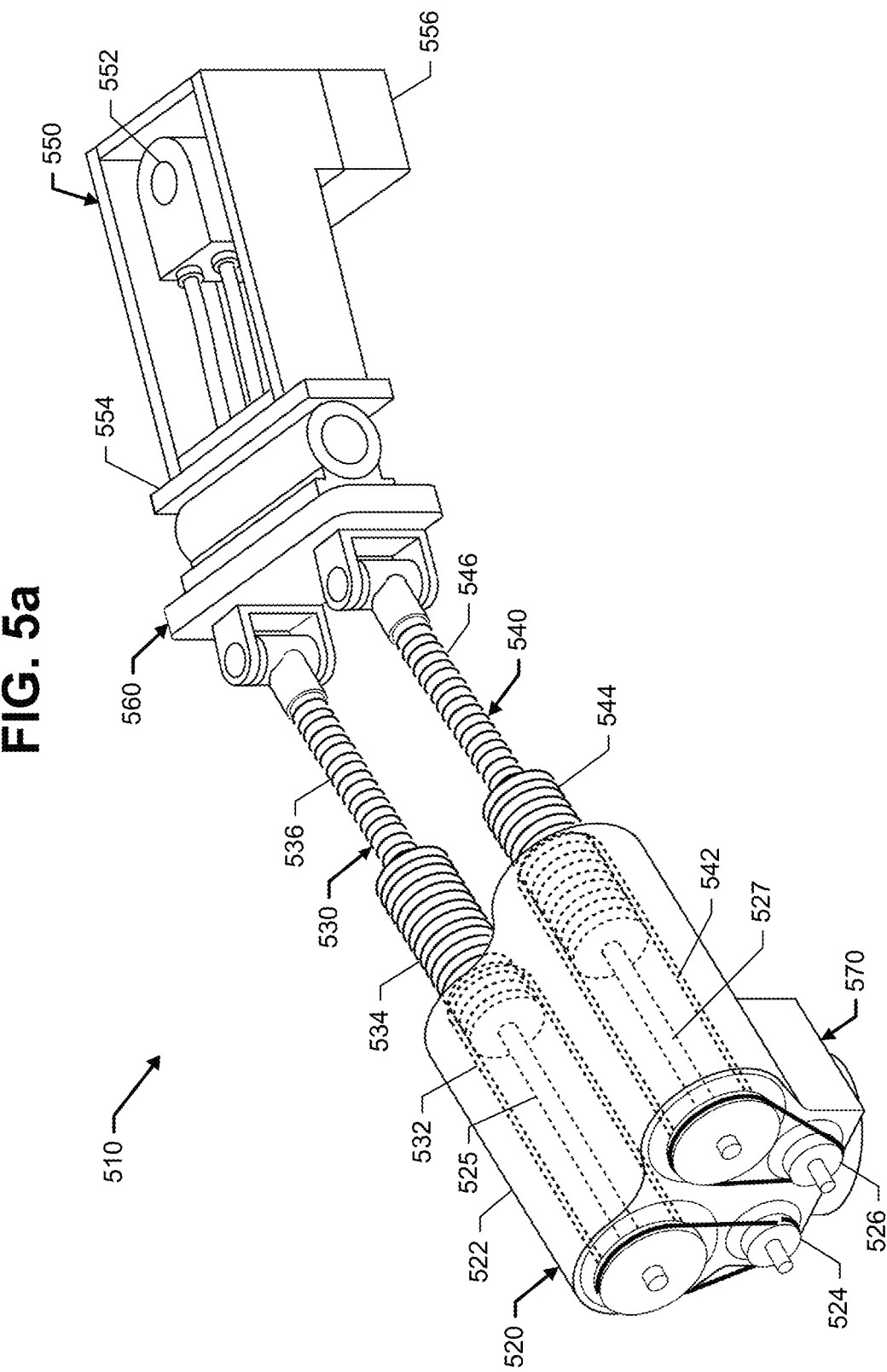
FIGS. 5a, 5b and 5c are illustrations of an embodiment of a robot including an end effector for performing fastening operations on a wing box.
Figure 5B:
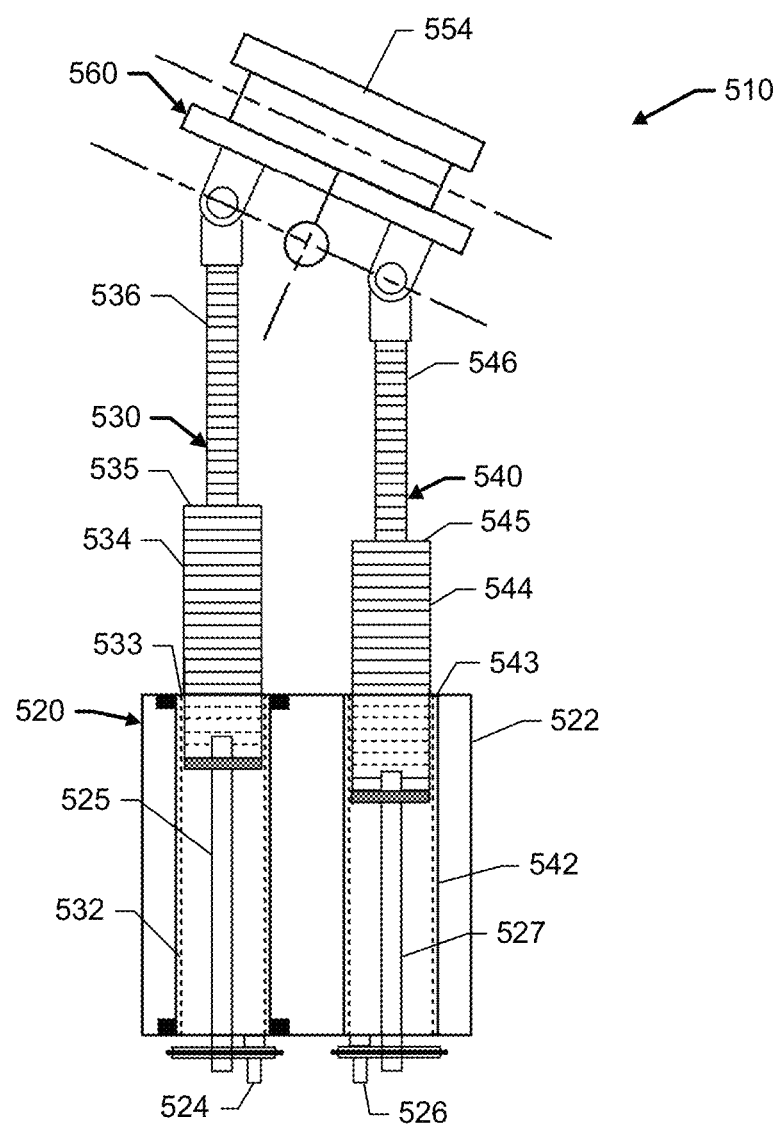
Figure 5C:
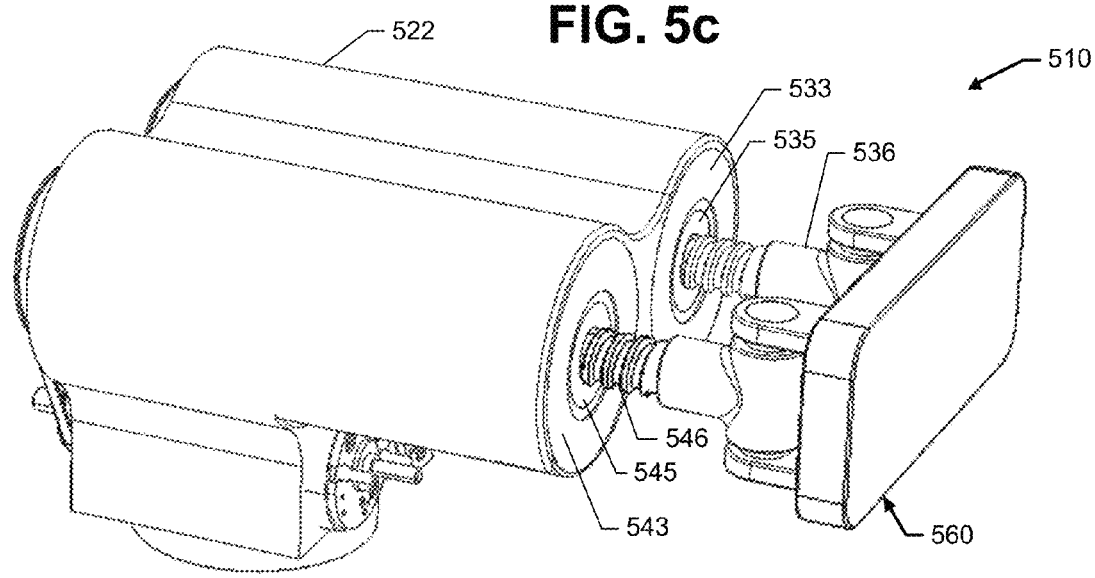

In other embodiments each telescoping assembly 130 and 140 further includes a third lead screw. In these embodiments, the third lead screw is concealed within the housing 122. The first lead screw and third lead screw of each telescoping assembly 130 and 140 are non-rotatable, and the second lead screw of each telescoping assembly is rotatable. A three lead screw assembly is illustrated in FIGS. 5a to 5c and described below in greater detail.

An advantage of using lead screws over other means (such as a linear rail for providing guidance during motion and an actuator for generating the motion) is that the lead screws not only move the end effector 150, but also provide linear guidance. In addition, the lead screws carry loads (e.g., axial and bending) that result from supporting the end effector 150.

Each lead screw interface may have a recirculating ball bearing bushing. In a two lead screw assembly, for instance, a recirculating ball bearing bushing may be located at the interface of the first and second lead screws 136 and 134, and another recirculating ball bearing bushing may be located at the interface of the first and second lead screws 146 and 144. Balls inside the bearing are pre-loaded to eliminate any back-lash. Such bushings provide a stable and stiff structure that can carry out precise motion and placement of end effector 150.

The actuator assembly 120 includes a means within the housing 122 for causing each lead screw assembly 130 and 140 to independently deploy and retract. In some embodiments, the means may include a first electric motor 124 and drive belt 126 for rotating the second lead screw 134, and a second electric motor 128 and drive belt 129 for rotating the second lead screw 144.

In some embodiments, the ends 132 and 142 of the first lead screws 136 and 146 may be pivoted directly to the end effector 150. In other embodiments, the ends 132 and 142 of the first lead screws 136 and 146 are coupled to the end effector 150 by an interface plate 160. As shown in FIGS. 1 and 2, the end 132 of the first lead screw 136 is coupled to the interface plate 160 by a pivot joint 162, which allows rotation about a $Z_L$ axis; and the end 142 of the first lead screw 146 is coupled to the interface plate 160 by a pivot joint 164, which allows rotation about a $Z_R$ axis.

The interface plate 160 may enable an additional degree of freedom. For instance, a revolute joint enables the end effector 150 to pivot about an $X_E$ axis.

The robot 110 further includes an electronic interface 170 and a controller 180 for communicating with the actuator assembly 120 via the electrical interface 170. The controller 180 generates commands for commanding the actuator assembly 120 to move the ends 132 and 142 of the telescoping assemblies 130 and 140. In some embodiments, the commands cause the motors 124 and 128 to rotate the second lead screws 134 and 144, which, in turn, cause the ends 132 and 142 to move along the X-axis. Relative angular speeds of the inner lead screws 134 and 144 are controlled to translate the end effector 150 along the X-axis and rotate the end effector 150 about the $Z_E$ axis. There is no need for communication between joint/controller.

Figure 3A:
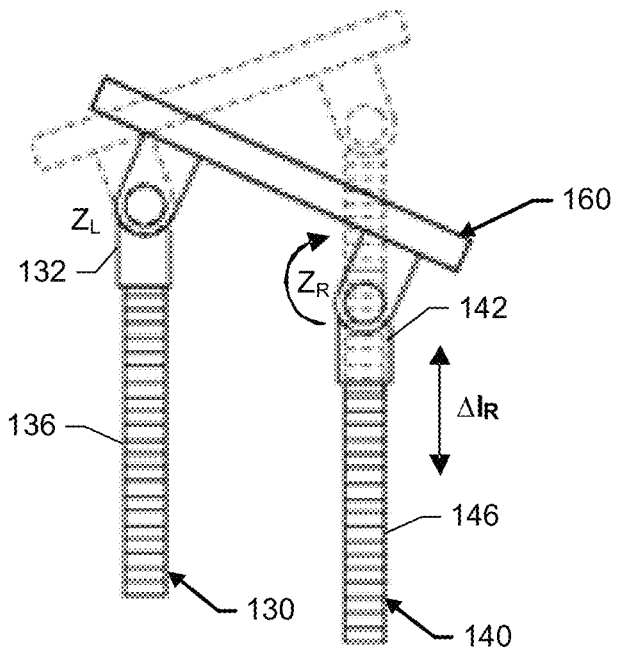
FIGS. 3a, 3b and 3c are illustrations of a method of operating the robot.
Figure 3B:
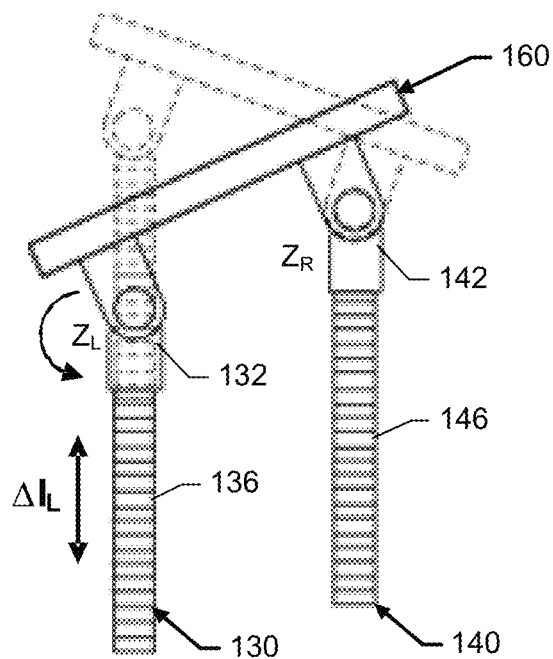
Figure 3C:
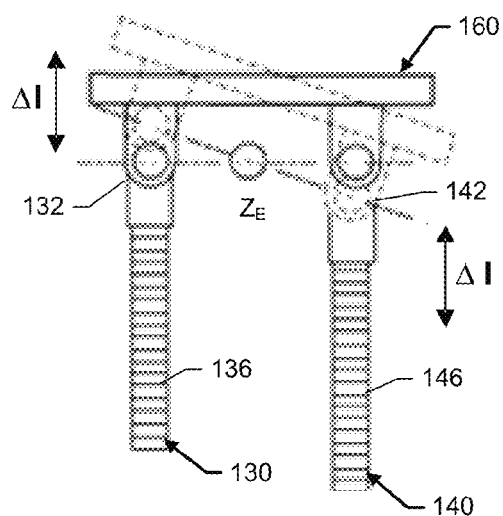

FIGS. 3a to 3c illustrate how the end effector 150 is oriented. Referring to FIG. 3a, the second lead screw 134 (not shown) of the first telescoping assembly 130 is not rotated, whereby the first lead screw 136 is held stationary. Simultaneously, the second lead screw 144 (not shown) of the second telescoping assembly 140 is rotated at a constant velocity to cause the first lead screw 146 to retract by a distance $\Delta l_R$. As a result, the interface plate 160 pivots about the $Z_L$ axis in a clockwise direction.

Referring to FIG. 3b, the second lead screw 144 (not shown) of the second telescoping assembly 140 is not rotated, whereby the first lead screw 146 is held stationary. Simultaneously, the second lead screw 134 (not shown) of the first telescoping assembly 130 is rotated to cause the first lead screw 136 to retract by a distance $\Delta l_L$. As a result, the interface plate 160 pivots about the $z_R$ axis in a counter-clockwise direction.

Referring to FIG. 3c, the second lead screws 134 and 144 (not shown) are rotated in opposite directions at the same speed. The first lead screw 136 of the first telescoping assembly 130 deploys by a distance $\Delta I$ while the first lead screw 146 of the second telescoping assembly 140 retracts by the same distance $\Delta I$. As a result, the interface plate 160 rotates about the $Z_E$ axis.

Other motions of the interface plate 160 may be achieved. For instance, if the second lead screws 134 and 144 are rotated simultaneously in the same direction, and if the rotational speeds are the same, then only translation will occur. If rotational speeds are different, both translation and rotation will result.

A robot herein is not limited to any particular operation. However, one topic of particular interest to the applicants involves fastening operations on aircraft wing boxes. The fastening operations may include drilling, countersinking and fastener insertion outside a wing box, and fastener termination inside the wing box. The robot 110 of FIGS. 1 and 2 may be adapted to perform the fastener termination inside a wing box.

Figure 4:
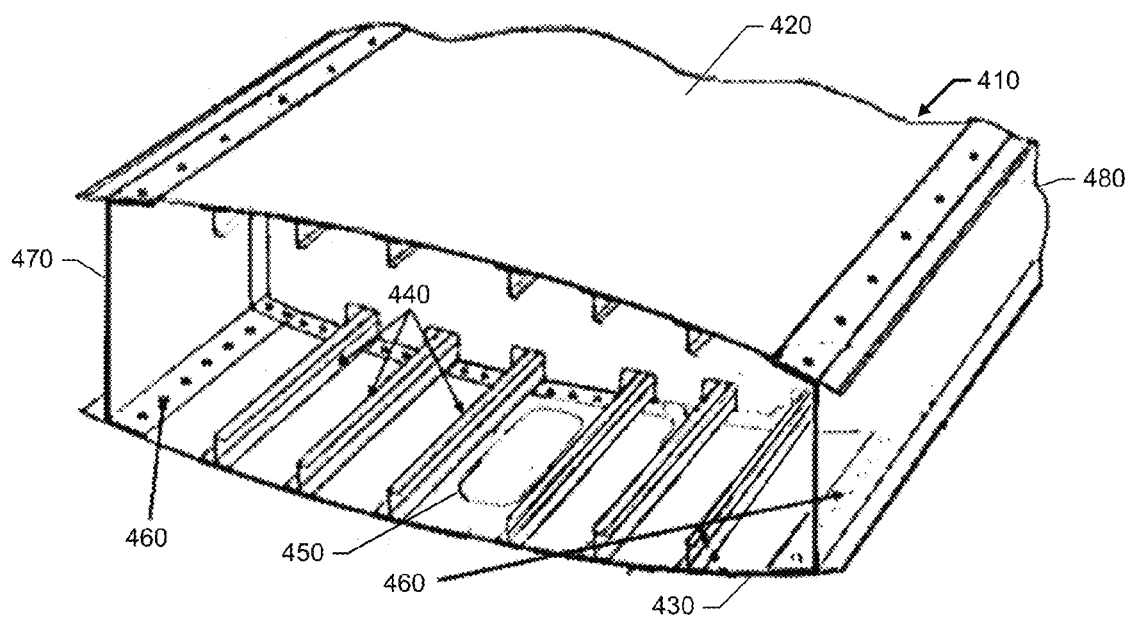
FIG. 4 is an illustration of a wing bay of an aircraft wing box.

Reference is now made to FIG. 4, which illustrates a wing bay 410 of a wing box (the wing box has a plurality of wing bays 410). The wing bay 410 includes top and bottom skin panels 420 and 430 and stringers 440 extending across the skin panels 420 and 430. An access port 450 is located in the bottom skin panel 430. The access port 450 leads to a confined interior space. Fastening operations 460 include the fastening of ribs 470 and 480 to the top and bottom skin panels 420 and 430.

Reference is now made to FIGS. 5a and 5b, which illustrate a robot 510 for performing fastening operations such as sleeve and nut placement within the confined space of a wing box. The robot 510 (which is based on the robot 110 of FIGS. 1-2) includes an actuator assembly 520, first and second telescoping assemblies 530 and 540, and an end effector 550. The end effector 550 is provided with a nut/sleeve installation tool 552, a vision system (not shown), and an electronic interface 554 that allows the nut/sleeve installation tool 552 and the vision system to communicate with a robotic interface 570. Attached to the end effector 550 is a clamping block 556 (e.g., a steel plate), which is used to clamp the end effector 550 against a wing box skin panel.

The first telescoping assembly 530 includes a third lead screw 532, second lead screw 534, and first lead screw 536. The third lead screw 532 is secured within the housing 522 of the actuator assembly 520 so as not to rotate.

In some embodiments, the third lead screw 532 may be press-fitted within the housing 522. In other embodiments, the third lead screw 532 may be assembled into the housing 522 by a "soft" interface (e.g., rubber), to enable some rotation of the lead screw 532 around the Z axis. This rotation is beneficial because the distance between the first lead screws 536 and 546 at the interface plate 560 is reduced during the interface plate rotation around the Z axis, while the distance between the lead screws 532 and 542 at the end of the housing 522 stays constant.

The third lead screw 532 has a bore with internal threads. The second lead screw 534 has external threads that engage the threaded bore of the third lead screw 532. When the middle screw 534 is rotated in one direction, it moves into the bore and retracts. When the second lead screw 534 is rotated in the opposite direction, it moves out of the bore and deploys.

The second lead screw 534 has a bore with internal threads. The first lead screw 536 has external threads that engage the threaded bore of the second lead screw 534. When the second lead screw 534 is rotated in one direction, the first lead screw 536 moves into the bore and retracts. When the second lead screw 534 is rotated in the opposite direction, the first lead screw 536 moves out of the bore and deploys.

This three lead screw design provides greater travel in a smaller package (than a two lead screw design). The three screw design is also simpler because the third lead screw 532 does not rotate within housing 522 (unlike a two lead screw design).

As shown in FIGS. 5b and 5c, all lead screw interfaces may have a recirculating ball bearing bushing. Thus, a first recirculating ball bearing bushing 533 may be located at the interface of the third lead screw 532 and the second lead screw 534, and another recirculating ball bearing bushing 535 may be located at the interface of the second lead screw 534 and the first lead screw 536. Balls inside the bearing are pre-loaded to eliminate any back-lash. These bushings 533 and 535 provide a stable and stiff structure that can carry out precise motion and placement of end effector 550.

The second lead screw assembly 540 is constructed in a similar manner. A third lead screw 542 is non-rotatable within the housing 522, a second lead screw 544 has external threads that engage an internally threaded bore of the third lead screw 542, and a first lead screw 546 has external threads that engage an internally threaded bore of the second lead screw 544. The end of the first lead screw 546 is pivoted at the interface plate 560. Each lead screw interface of the second telescoping assembly 540 may have a recirculating ball bearing bushing 543 and 545

The ends of the first lead screws 536 and 546 are pivoted to an interface plate 560. The interface plate 560 is coupled to the end effector 550 via a joint.

The actuator assembly 520 includes a first motor 524 and shaft 525 for rotating the second lead screw 534 of the first lead screw assembly 530. The actuator assembly 520 further includes a second motor 526 and shaft 527 for rotating the second lead screw 544 of the second lead screw assembly 540.

Figure 6:
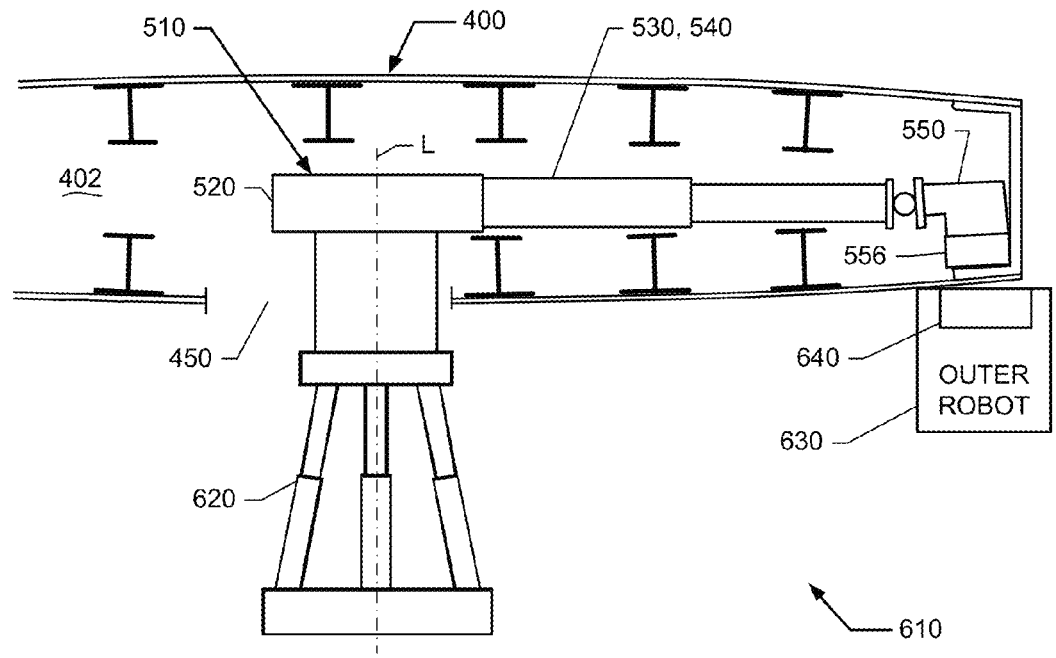
FIG. 6 is an illustration of a robotic system for performing fastening operations on the wing box.

Reference is now made to FIG. 6, which illustrates a robotic system 610 for performing fastening operations on a wing box 400. The robotic system 610 includes an inner robot 510 for performing sleeve and nut placement within the confined space 402 of the wing box 400. The telescoping assemblies 530 and 540 have sufficient extension to reach a corner of the wing box 400, and the actuator assembly 520 has sufficient power to drive the telescoping assemblies 530 and 540.

A stand 620 supports the inner robot 510 such that the telescoping assemblies 530 and 540 will extend in an orthogonal direction from a longitudinal axis L of the stand 620. Height of the stand 620 is adjustable along the longitudinal axis L in order to raise the inner robot 510 through an access port 450 of the wing box 400 and into the confined space 402. The stand 620 allows the inner robot 510 to be rotated about the longitudinal axis L.

The robotic system 610 further includes an outer robot 630, which carries an outer end effector 640. The outer end effector 640 is equipped with tools for performing drilling, countersinking and fastener installation. The outer end effector 640 may also carry a vision system and a strong electromagnet. As part of a fastening operation, the strong electromagnet may be energized to attract the clamping block 556 on the end effector 550, which is on the opposite side of a skin panel.

The robotic system 610 further includes a means (not shown) for moving the outer robot 630 along the outside of the wing box 400. Such means may include, but is not limited to, a gantry, scaffolding, featuring, and a mobile cart.

Additional reference is made to FIG. 7, which illustrates a method of manufacturing a wing box. At block 710, the wing box is pre-assembled. During pre-assembly, faying (i.e., overlapping) surfaces of wing box parts (e.g., spars, skin panels, and ribs) may be covered with sealant and pressed together. The sealant eliminates gaps between the faying surfaces to facilitate burr less drilling. The pressed-together parts of the wing box may then be fastened (temporarily or permanently) with instrumented fasteners disclosed in assignee's U.S. Pat. No. 7,937,817 issued May 10, 2011. In one embodiment, an instrumented fastener includes one or more light sources (e.g., light-emitting diodes) configured to produce light beacons in opposite directions. Information regarding the instrumented fastener (e.g., fastener number) may be encoded in the light beacons.

At block 720, the inner robot 510 is positioned on the stand 620, with the telescoping arms 530 and 540 in fully retraced positions. At block 730, the stand 620 lifts the inner robot 510 through the access port 450 and into the confined space 402 of a wing bay. The inner robot 520 is lifted to a height that allows the assemblies 530 and 540 and the end effector 550 to be extended without hitting any of the stringers.

At block 740, the inner and outer end effectors 550 and 640 are positioned over a target fastener location. The outer robot 630 positions the outer end effector 640. The inner robot 510 positions the inner end effector 550 by commanding the telescoping assemblies 530 and 540 to deploy until the inner end effector 550 has the proper position and orientation over the target location. The rotational joint (between the interface 560 and end effector 550) may also be commanded to raise or lower the inner end effector 550.

The inner and outer robots 520 and 630 may use the vision systems and the instrumented fasteners to obtain precise positioning and orientation of the end effectors 550 and 640 as described in assignee's U.S. Ser. No. 12/117,153 filed May 8, 2008, the specification of which is incorporated herein by reference. (U.S. Ser. No. 12/117,153 issued as U.S. Pat. No. 8,301,302 on 30 Oct. 2012.) The instrumented fasteners allow the robots 510 and 630 to determine position and an orientation of an axis extending through a fastener location. The light beacons are directed inside and outside the wing bay, so they can be sensed by both robots 510 and 630.

At block 750, once the end effectors 550 and 640 have been precisely positioned, the electromagnet on the outer end effector 640 is energized. As a result, the outer end effector 590 magnetically attracts the clamping block 556 on the inner end effector 550, thereby clamping skin panel between two end effectors 550 and 640.

At block 760, the outer end effector 640 performs burr less drilling at the target location. Countersinking may also be performed. The outer end effector 640 then inserts a fastener through the drilled hole.

At block 770, the inner end effector 550 terminates the end of the inserted fastener. For example, the inner end effector 550 installs a sleeve and nut onto the fastener.

If additional fastening operations are to be performed (block 780), the end effectors 550 and 640 are moved to a new target location and the operations at blocks 740-770 are repeated. After the last fastening operation in the wing bay has been performed (block 785), the telescoping assemblies 530 and 540 of the inner robot 510 are fully retracted, and the inner robot 510 is lowered out of the confined space 402 (block 790), and moved to the access port 450 of another wing bay (block 730). The operations at blocks 740-780 are repeated until fastening operations have been performed on each wing bay of the wing box.

A system herein replaces manual assembly of wing boxes and other structures having confined spaces. Thousands of fastening operations are performed much faster than manual labor. Extremely tight aircraft tolerances are satisfied.

A system herein not only increases productivity. It also reduces worker injuries, since assembly of a wing box is ergonomically challenging (manually installing nuts/sleeves inside the confined space).

A system herein is not limited to fasteners including bolts and nuts. Other fasteners include, without limitation, rivets.

A system herein is not limited to fastening operations. A system herein may be used to perform other manufacturing operations, such as sealant application, cleaning, painting and inspection.

A system herein is not limited to aircraft. For example, a system herein may be applied to containers, autos, trucks, and ships.

The invention claimed is:

1. A robot comprising:
an actuator assembly including first and second motors at least partially disposed in a housing;
a first lead screw assembly cantilevered from the actuator assembly and operatively coupled to the first motor, the first lead screw assembly including a first lead screw threadably telescoping within a second lead screw, wherein the second lead screw is at least partially disposed within the housing;
a second lead screw assembly cantilevered from the actuator assembly parallel to the first lead screw assembly and operatively coupled to the second motor, the second lead screw assembly including a first lead screw threadably telescoping within a second lead screw, wherein the second lead screw is at least partially disposed within the housing;
an end effector coupled to and supported by the ends of the lead screw assemblies; and
a stand coupled to the actuator assembly and defining a longitudinal axis, wherein a height of the stand is adjustable along the longitudinal axis;
wherein no more than two lead screw assemblies are disposed between the actuator assembly and the end effector, the no more than two lead screw assemblies including the first lead screw assembly and the second lead screw assembly, and the actuator assembly causing each of the first and second lead screw assemblies to independently deploy and retract in an orthogonal direction relative to the longitudinal axis of the stand.

2. The robot of claim 1, wherein the second lead screw of each of the first and second lead screw assemblies comprises a rotatable lead screw having an internally threaded bore, and wherein the first lead screw of each of the first and second lead screw assemblies comprises a non-rotatable lead screw having an end coupled to the end effector and having an external thread engaging the internally threaded bore of the rotatable lead screw.

3. The robot of claim 1, wherein:
each of the first and second lead screw assemblies further includes a third lead screw;
the first, second, and third lead screws of each of the first and second lead screw assemblies extend outward from the actuator assembly along an X-axis;
an end of each of the first lead screws is coupled to the end effector;
each of the first lead screws has an external thread engaging an internally threaded bore of a respective second lead screw;
each of the second lead screws including an external thread engaging an internally threaded bore in a respective third lead screw; and
each of the third lead screws is mounted for non-rotation about the X-axis within a housing of the actuator assembly, whereby rotating the second lead screw causes the first lead screw end to move between deployed and retracted positions.

4. The robot of claim 3, wherein for each of the first and second lead screw assemblies, a first recirculating ball bearing bushing is located at an interface of the third lead screw and the second lead screw, and a second recirculating ball bearing bushing is located at an interface of the second lead screw and the first lead screw.

5. The robot of claim 1, further comprising an interface plate rotationally coupled to the end effector, and wherein the ends of the first and second lead screw assemblies are pivotably coupled to the interface plate.

6. The robot of claim 1, further comprising a controller for commanding the actuator assembly to move the ends of the first and second lead screw assemblies simultaneously in the same direction, whereby the end effector is linearly translated.

7. The robot of claim 1, further comprising a controller for commanding the actuator assembly to move the ends of the first and second lead screw assemblies simultaneously in opposite directions, whereby the end effector is rotated.

8. The robot of claim 1, further comprising a controller for commanding the actuator assembly to move the end of the first lead screw assembly while commanding the actuator assembly to hold stationary the end of the second lead screw assembly, whereby the end effector is rotated.

9. The robot of claim 1, wherein the end effector is equipped to perform fastening tasks.

* * * * *